United States Patent
Smith et al.

(10) Patent No.: US 11,176,929 B1
(45) Date of Patent: Nov. 16, 2021

(54) ARTIFICIAL INTELLIGENCE (AI) LANGUAGE DETECTION AND TRANSLATION SYSTEM FOR SCANNING RADIO SIGNALS AND RULES-BASED TRANSMISSION OF ALERTS

(71) Applicant: Kerberos International, Inc., Temple, TX (US)

(72) Inventors: Sammy John Smith, Temple, TX (US); Myra Dawn Cole, Temple, TX (US)

(73) Assignee: Kerberos International, Inc., Temple, TX (US)

(*) Notice: Subject to any disclaimer, the term of this patent is extended or adjusted under 35 U.S.C. 154(b) by 264 days.

(21) Appl. No.: 16/447,318

(22) Filed: Jun. 20, 2019

Related U.S. Application Data

(60) Provisional application No. 62/688,280, filed on Jun. 21, 2018.

(51) Int. Cl.
    *G10L 15/18*     (2013.01)
    *G08B 25/10*     (2006.01)
    (Continued)

(52) U.S. Cl.
    CPC .......... *G10L 15/1822* (2013.01); *G06F 40/30* (2020.01); *G06F 40/58* (2020.01); *G08B 25/10* (2013.01); *H04W 12/80* (2021.01)

(58) Field of Classification Search
    USPC .... 379/32.01–39, 67.1, 93.03; 382/155–162; 704/1–10, 200–278; 706/1–62
    See application file for complete search history.

(56) References Cited

U.S. PATENT DOCUMENTS

| | | |
|---|---|---|
| 6,697,008 B1 | 2/2004 | Sternowski |
| 7,769,705 B1 * | 8/2010 | Luechtefeld .......... G06Q 10/06 706/47 |

(Continued)

OTHER PUBLICATIONS

Signals Intelligence, National Security Agency—Central Security Service, n.d. [online], [retrieved on Jun. 5, 2019]. Retrieved from the Internet <https://www.nsa.gov/what-we-do/signals-intelligence/>.

(Continued)

*Primary Examiner* — Marcellus J Augustin
(74) *Attorney, Agent, or Firm* — Craige Thompson; Thompson Patent Law; Timothy D. Snowden

(57) ABSTRACT

Apparatus and associated methods relate to a system including a portable hardware device having a radio antenna, the device being operably coupled to a network, where the device includes electronics for scanning ambient radio messages using the antenna, evaluating a message for sentiment (e.g., intent-to-harm) using at least one artificial intelligence technique, and upon determining the presence of intent-to-harm, transmitting an alert signal over the network to a target entity as determined by a set of alert transmission rules based at least in part on the content/context/metadata of the message. In an illustrative example, a portable pack may be preconfigured with automatic language translation and speech detection capabilities. The pack may scan ambient radio signals for specific words/phrases of interest (W/POI). Upon detecting dangerous/aggressive sentiment, an alert may be relayed to a higher command, advantageously providing decision-makers with invaluable, real-time intelligence to adapt to fast-changing developments on the battlefield.

19 Claims, 11 Drawing Sheets

(51) Int. Cl.
*G06F 40/30* (2020.01)
*G06F 40/58* (2020.01)
*H04W 12/80* (2021.01)

(56) References Cited

U.S. PATENT DOCUMENTS

| | | | | |
|---|---|---|---|---|
| 8,731,934 B2 * | 5/2014 | Olligschlaeger | ...... | G06F 16/685 704/270 |
| 8,898,098 B1 * | 11/2014 | Luechtefeld | ........... | G06Q 10/06 706/47 |
| 9,413,891 B2 * | 8/2016 | Dwyer | .................... | G10L 15/30 |
| 2008/0261509 A1 * | 10/2008 | Sen | ........................ | H04W 12/02 455/1 |

OTHER PUBLICATIONS

Welcome to GhostWolf Industries, GhostWolf Industries, n.d. [online], [retrieved on Jun. 5, 2019]. Retrieved from the Internet <https://www.ghostwolfindustries.com/>.

COMINT/DF HF-6 GHz Systems: Delivering SIGINT-Based Complete Order of Battle for Land, Sea, and Air, Elbit Systems EW and SIGINT—Elisra, n.d. [online], [retrieved on Jun. 5, 2019]. Retrieved from the Internet <https://elbitsystems.com/media/COMINT_DF_Solutions.pdf>.

Studies in Intelligence, Studies in Intelligence vol. 59, No. 1, Mar. 2015 [online], [retrieved on Jun. 5, 2019]. Retrieved from the Internet <https://www.cia.gov/library/center-for-the-study-of-intelligence/csi-publications/csi-studies/studies/vol-59-no-1/pdfs/Studies-Extracts.pdf>.

Sail Labs, Sail Labs, n.d. [online], [retrieved on Jun. 5, 2019]. Retrieved from the Internet <https://www.sail-labs.com/>.

Sail Labs, The Sail Labs OSINT Solution, YouTube, Feb. 14, 2018 [online], [retrieved on Jun. 5, 2019]. Retrieved from the Internet <https://www.youtube.com/watch?time_continue=182&v=sG0HGuIZ5BE>.

Damien Van Puyvelde, Stephen Coulthart, and M. Shahriar Hossain, Beyond the buzzword: big data and national security decision-making, International Affairs, Oxford Academic, vol. 93, Issue 6, pp. 1397-1416, Nov. 2017 [online], [retrieved on Jun. 5, 2019]. Retrieved from the Internet <https://academic.oup.com/ia/article-abstract/93/6/1397/4111109?redirectedFrom=PDF>.

James L. Regens, Augmenting human cognition to enhance strategic, operational, and tactical intelligence, Intelligence and National Security, Taylor & Francis Online, Feb. 19, 2019 [online], [retrieved on Jun. 5, 2019]. Retrieved from the Internet <https://www.tandfonline.com/doi/abs/10.1080/02684527.2019.1579410>.

\* cited by examiner

| Entity to Alert | Alert Receiving Device(s) | Alert Delivery Method | TX Frequency | Language | W/POI | Sentiment | Encrypted | Modulation Mode | Origination Location |
|---|---|---|---|---|---|---|---|---|---|
| U.S. FOB 25 Cmdr in Afghanistan | Cell phone | Text/SMS | N/A | Arabic | "artillery;" "weaponry" | "unfriendly;" "hostile;" "aggressive" | N/A | N/A | Kandahar Province, Afghanistan |
| French FOB 11 Cmdr in Central African Republic | Laptop computer | Email | 5 MHz – 2.1 GHz | N/A | N/A | "hostile;" "aggressive" | N/A | N/A | Central African Republic |
| U.S. Embassy in Pakistan | Desktop computer | Email | 6.5 GHz – 6.7 GHz | Arabic | N/A | "unfriendly;" "hostile;" "aggressive" | Yes | FM | 30 mi. Radius within Karachi, Pakistan |
| Allied Oil Tanker off coast of Yemen | Cell phone | Text/SMS | N/A | Yemeni Arabic | "pirate;" "ship;" "board" | "neutral;" "unfriendly;" "hostile;" "aggressive" | N/A | N/A | Gulf of Aden |
| U.S. National Security Agency HQ | Computer server | TCP | 4.5 GHz | Turkish | N/A | "unfriendly;" "hostile;" "aggressive" | No | QAM | N/A |
| U.K. GCHQ | Computer server | FTP | N/A | N/A | N/A | "unfriendly;" "hostile;" "aggressive" | N/A | N/A | London, U.K. |
| Mayor of New York City | Cell phone | Push notification | N/A | English | "bomb;" "explosion" | N/A | N/A | N/A | New York City, New York, U.S. |

ARTIFICIAL INTELLIGENCE (AI) LANGUAGE DETECTION AND TRANSLATION SYSTEM FOR SCANNING RADIO SIGNALS AND RULES-BASED TRANSMISSION OF ALERTS

CROSS-REFERENCE TO RELATED APPLICATIONS

This application claims the benefit of U.S. Provisional Application Ser. No. 62/688,280, titled "Artificial Intelligence (AI) Language Detection and Translation System for Scanning Transmitted Signals (the "TRANS-L8" System)," filed by Sammy John Smith, on Jun. 21, 2018.

This application incorporates the entire contents of the foregoing application(s) herein by reference.

TECHNICAL FIELD

Various embodiments relate generally to communications intelligence (COMINT) systems.

BACKGROUND

The intelligence community (IC) is a collection of entities, such as governmental agencies, that conduct intelligence activities to support foreign policy and national security goals. Signals intelligence (SIGINT) refer to intelligence-gathering by intercepting signals for intelligence purposes. Communications intelligence (COMINT) refers to intelligence-gathering by intercepting communications between people or entities (e.g., detecting the speech in a voice communication), and may be a sub-field within SIGINT. Electronic signals intelligence (ELINT) refers to intelligence-gathering by use of electronic sensors focused on non-communications signals intelligence, and may be also be sub-field within SIGINT.

Various SIGINT systems and devices have been and are currently used in intelligence gathering settings. For example, during World War II, significant SIGINT operations were executed, such as the effort of intercepts and cryptanalysis for British forces, code-named "Ultra." SIGINT operational platforms may include various platform types, such as ground, ship, submarine, aircraft, and satellite platforms. SIGINT platforms may play a vital role in national security by providing decision-makers with critical information they need to advance goals/objectives, defend against attacks, and save lives.

SUMMARY

Apparatus and associated methods relate to a system including a portable hardware device having a radio antenna, the device being operably coupled to a network, where the device includes electronics for scanning ambient radio messages using the antenna, evaluating a message for sentiment (e.g., intent-to-harm) using at least one artificial intelligence technique, and upon determining the presence of intent-to-harm, transmitting an alert signal over the network to a target entity as determined by a set of alert transmission rules based at least in part on the content/context/metadata of the message. In an illustrative example, a portable pack may be preconfigured with automatic language translation and speech detection capabilities. The pack may scan ambient radio signals for specific words/phrases of interest (W/POI). Upon detecting dangerous/aggressive sentiment, an alert may be relayed to a higher command, advantageously providing decision-makers with invaluable, real-time intelligence to adapt to fast-changing developments on the battlefield.

Various embodiments may achieve one or more advantages. For example, in various embodiments, higher echelon collection may significantly benefit from the full capabilities of an artificial intelligence (AI) platform by not only providing near real-time translation of collected signals, but also providing automated analytics of the collection based on user provided criteria and by triaging the collection for more advanced translation and analysis by skilled analysts. Various implementations may utilize both AI and radio technologies to aid the war fighter. In some examples, real-time alerts based on AI analysis may provide decision-makers the to predict the actions of adversaries on the battlefield, thus advantageously allowing forces to preemptively act in response to intelligence insights. Some embodiments may, for example, eliminate the need for a dedicated human translator, thus reducing the number of personnel being deployed in the field. Various implementations may achieve the goal of invaluable information from adversaries in inaccessible areas, such as mountainous or foreign lands. By using AI having natural language processing (NLP) and speech recognition capabilities, various COMINT system disclosed herein may bring the benefits associated with machine learning directly into intelligence gathering apparatuses. Various examples may function as autonomous systems having the capability to beneficially aid military, diplomatic, and intelligence personnel by performing data analysis (such as signal detection and information filtering) in (near) real-time. Real-time alerts may, in various embodiments, beneficially allow decision-makers to perform rapid identification of impending warfighter threat to save soldiers' lives. Using specific triaging rules, alerts may advantageously be transmitted to the right personnel in the chain of command. A COMINT system that uses improved AI-based techniques to identify threats uncovered through interception of an adversary's radio communications and send alert signals to the proper entities in near real-time may beneficially avoid crisis and save lives.

The details of various embodiments are set forth in the accompanying drawings and the description below. Other features and advantages will be apparent from the description and drawings, and from the claims.

BRIEF DESCRIPTION OF THE DRAWINGS

FIG. 11 depicts a table illustrating an exemplary set of alert transmission parameters/criteria.

Like reference symbols in the various drawings indicate like elements.

DETAILED DESCRIPTION OF ILLUSTRATIVE EMBODIMENTS

Figure 1:
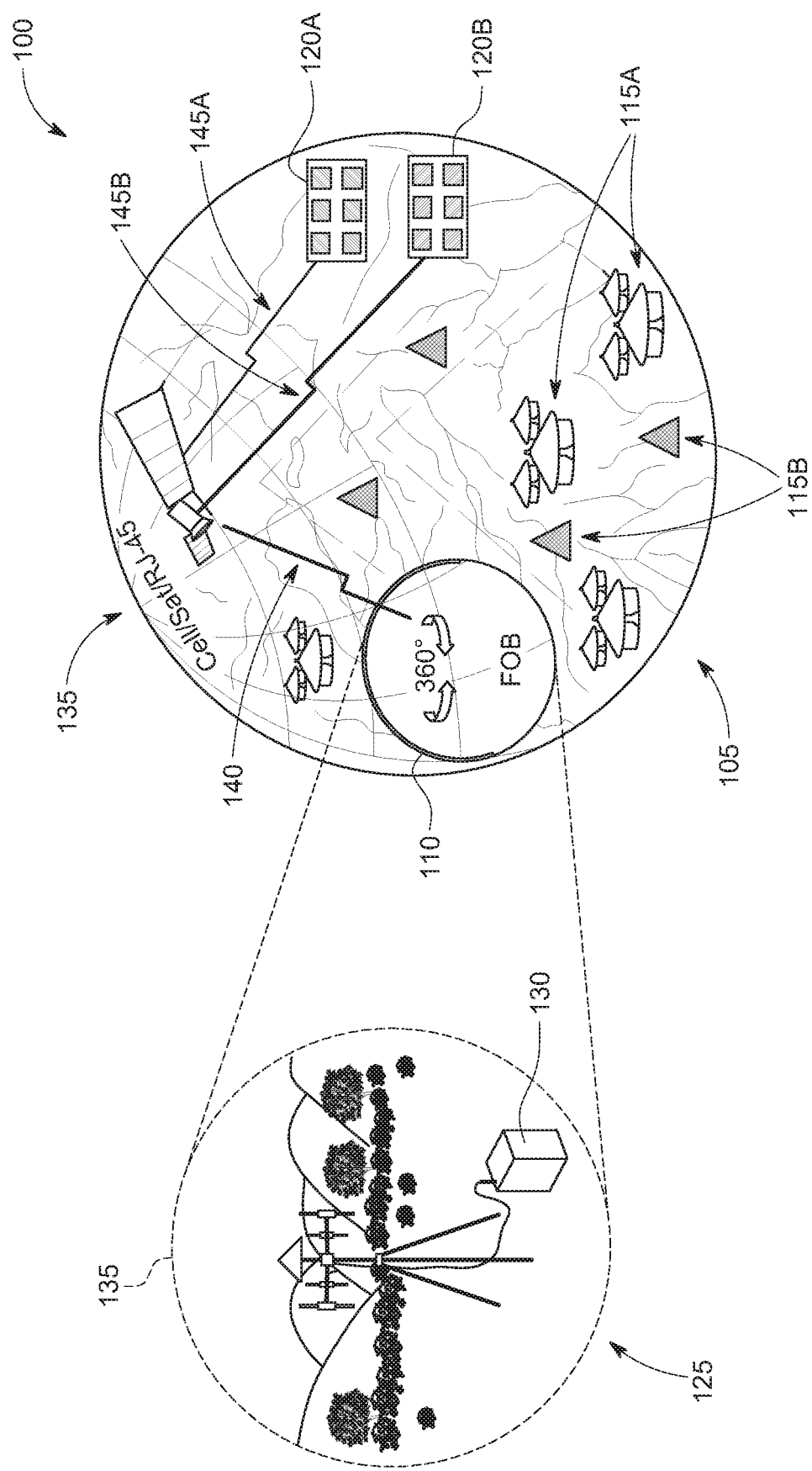
FIG. 1 depicts a diagrammatic view of an exemplary artificial intelligence (AI) communications intelligence (COMINT) system deployed in the field.

FIG. 1 depicts a diagrammatic view of an exemplary artificial intelligence (AI) communications intelligence (COMINT) system deployed in the field. A deployment setting 100 includes a geographic area 105. In the depicted example, the geographic area 105 is a mountainous terrain with various geographic features such as valleys and rivers. The area 105 may be designated as a combat zone. Accordingly, a forward operating base (FOB) 110 may be established as an operational level military base in the area 105, for example, to provide security and military oversight over at least a portion of the area 105.

The area 105 may also include various other establishments such as villages 115A and camps 115B. The military personnel at the FOB 110 may be unaware of unfriendly/hostile actors that may reside in the area 105 (for example, insurgents hiding out in villages 115A or planning a surprise attack at camps 115B). Furthermore, additional bases 120A, 120B may also exist in the area 105. The bases 120A, 120B, in this example, are in the same faction at the FOB 110. The base 120A may be, for example, a United States Host Services base, while the base 120B may be, for example, an area of responsibility headquarters (AOR HQ) Unfriendly/hostile actors in the are 105 may be planning an attack on either one of the bases 120A, 120B. Specifically, the unfriendly/hostile actors may be communicating their attack plans via various types of radio transmission (e.g., walkie talkies, radio antennae, cell phones). While the radio transmissions of these unfriendly/hostile actors may be transmitted in various directions, the personnel at bases 120A, 120B may be totally oblivious to the attack plans being developed by the hostile actors over radio communication. As such, when the attack is actually executed by the hostile actors, the personnel at the bases 120A, 120B may be caught off guard and be entirely unprepared for the incoming attack against them. However, if the personnel at the bases 120A, 120B had foreknowledge of, or intelligence regarding, the incoming attack, the bases 120A, 120B could prepare for the attack and take preemptive measures to minimize harm and loss of life as a result of the attack.

Accordingly, a COMINT system 125 established at the FOB 110 may be used to deliver valuable intelligence to the bases 120A, 120B by intercepting the radio communications of the hostile actors and alerting the relevant personnel at the base 120A, 120B using artificial intelligence and machine learning. For example, the system 125 may be used to scan ambient radio messages, evaluate the radio messages for words/phrases of interest (as well as sentiment) using artificial intelligence/machine learning (AI/ML) algorithms, and then transmit an alert signal to the relevant personnel at the bases 120A, 120B based on the content/context/metadata of the message and a set of alert transmission rules. By mining ambient radio transmissions for the communications of hostile actors using AI/ML capabilities, the system 125 may rapidly identify and alert (in real-time) the proper military personnel of impending warfighter threats, advantageously allowing for enhanced prediction of unfriendly military operations, significantly improved threat response times, and preemptive enemy force neutralization.

Specifically, the COMINT system 125 may include a (portable) hardware device 130, such as an electronic computer or a server, for example. The hardware device 130 may include a computer processor and computer memory. The memory may store various AI/ML code/instructions that can be executed by the processor to provide the AI/ML capabilities of the system 125. The device 130 may be operably coupled to a radio module 135 having a radio antenna, such that the device 130 may receive data streams from the radio module 140 indicative of intercepted ambient radio communications. The device 130 may be operably coupled to a network 135, which may be a satellite network, for example. The radio module 135 and/or the device 130 may include electronics for scanning ambient radio messages using the antenna.

These scanned messages may be evaluated for sentiment (e.g., intent-to-harm) using at least one artificial intelligence/machine learning technique. For example, the messages may be scanned for words and/or phrases of interest that may be indicative of aggression or hostility. Upon determining the presence of intent-to-harm in the message the device 130 may transmit a real-time alert signal 140 over the network 135 to a target entity, such as a commander of either of the bases 120A, 120B. The alert signal may be addressed to a specific entity as determined by a set of alert transmission rules (perhaps stored in memory of the device 130) based at least in part on the content/context/metadata of the intercepted message. For example, the alert signal may be addressed to the commander of base 120A, but not the commander of base 120B, because the intercepted signal may have originated from a location in close proximity to the base 120A, but distant from base 120B. In this sense, valuable intelligence derived from analysis of unfriendly radio communications may beneficially be transmitted in (near) real-time to the relevant personnel who can then preemptively adapt to the incoming hostile military force.

The network 135 may deliver alert messages using various methods. For example, if the network 135 is a satellite network, then the device 130 may transmit an alert message up to the satellite, which may then beam down transmissions 145A, 145B to the relevant parties to alert them of an impending attack. In various examples, the network 135 may be a wireless cell network. In some implementations, the network 135 may be a hardwired network, such as a network that uses RJ-45 cable, for example. In some examples, the data links to various entities may be of different bandwidth capabilities. For example, the data link 145A may be a higher bandwidth link that allows for transmission of voice and/or text data transfer, while the data link 145B may be a minimal bandwidth link (e.g., <1 MB). Accordingly, the system 125 may transmit varying levels of information depending on the bandwidth connection to the party to be alerted.

The radio module 135, in some examples, may include an omnidirectional antenna that is capable of monitoring radio signals in all directions (e.g., full 360° of radio signal measurement). In various examples, the system 125 may be capable of tracking a large number of radio conversations in parallel (e.g., up to 30 different radio conversations may be monitored at the same time). The device 130 may, in some embodiments, be located as substantially the same place as the radio module 135, which may allow for higher data rate exchange between the device 130 and the module 135. In various examples, the device 130 may be remotely located from the module 135. For example, the device 130 may be a remote server located on friendly soil that is remotely coupled to the module 135. In some examples, the device 130 may be associated with a single FOB or multiple FOBs. In various embodiments, the radio module 135 may be a forward deployed radio that may be fixedly mounted on a tripod that may be strategically placed in the field or on top of a building, for example. In various examples, the system 125 (that includes the computing device 130 and radio module 135) may be referred to as a "TRANS-L8™ Node."

TRANS-L8™ or TRANSL8™ may refer to a (man-portable) platform deployed at forward operating bases (FOBs). TRANS-L8™ may leverage automatic language detection & translation (ALD&T) combined with radio frequency (RF) technology to constantly scan unencrypted transmissions on multiple frequencies of interest for words/phrases of interest (W/POI) and sentiment/intent criteria. TRANS-L8™ may support multiple languages, in some embodiments. When a W/POI is detected, the TRANS-L8™ system may send an alert to the FOB command and control (C&C) about potential impending danger. The system may also forward the source in native or translated form to a higher command for further intelligence analysis. Higher echelon collection can significantly benefit from the full capabilities of the TRANS-L8™ artificial intelligence (AI) platform by not only providing near real-time translation of collected signals, but also providing automated analytics of the collection based on user provided criteria and by triaging the collection for more advanced translation and analysis by skilled analysts. Beyond this, the AI can be configured to link other (government) data sets and identify relevant intelligence holdings for any particular collected signal, target, selector, group or topic, for example, thus providing a faster and more in-depth body of analysis and enhancing targeting capabilities.

Various embodiments may provide a "machine language linguist" in FOBs or embassies, for example, where few human linguists are available (a force multiplier). Some examples may reduce the front-end parsing workload of human linguists. In various examples, the system may perform rapid identification of threats and alert the relevant parties on an impending warfighter threat (to save lives). In various implementations, advanced translation capabilities along with AI-based automated analytics may enable quick and accurate triaging of information for forwarding to a human analyst (a force multiplier). Some examples may advantageously only request power and a transmission medium for integration into existing (IC) systems.

Figure 2:
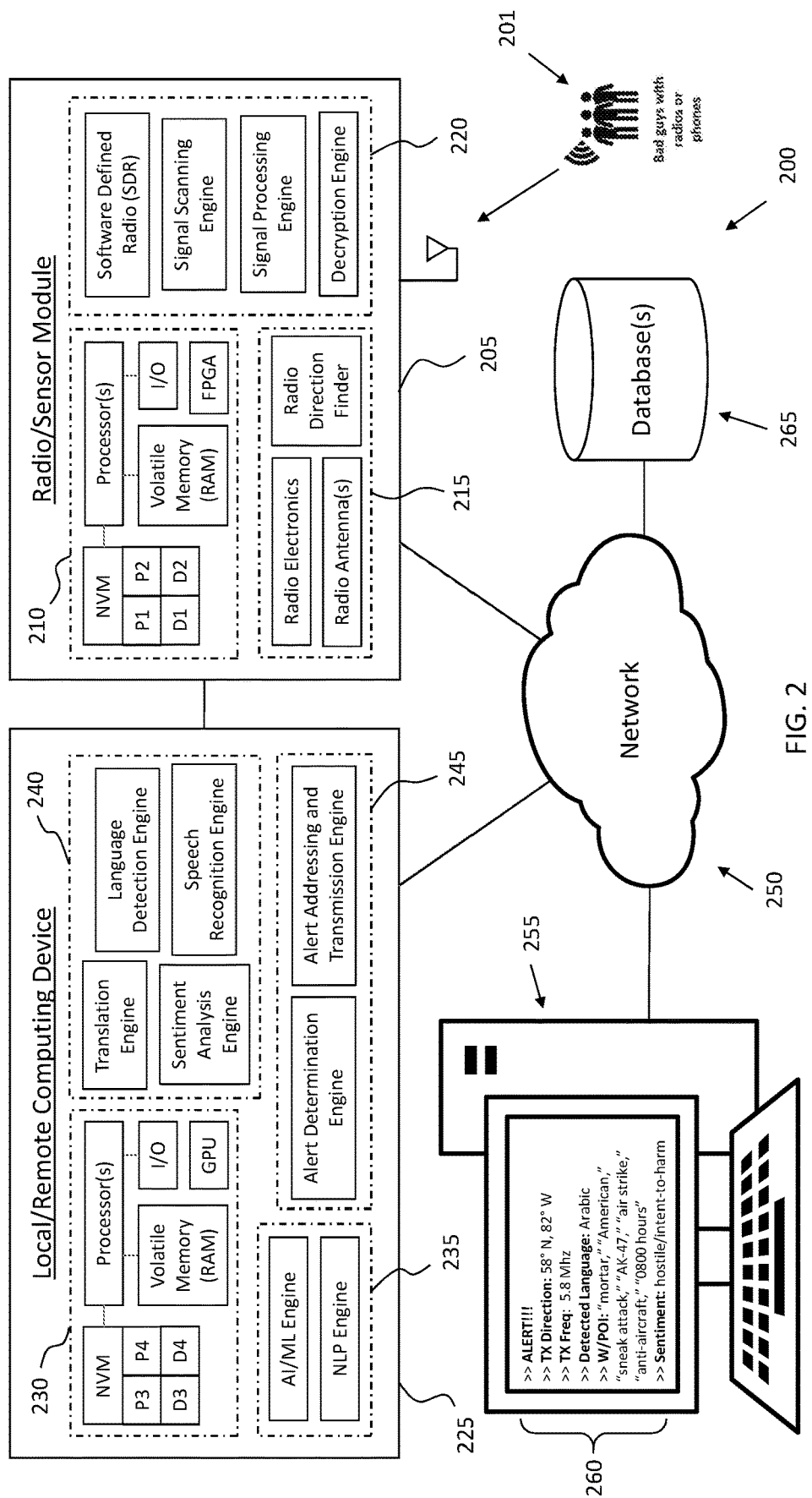
FIG. 2 depicts a block diagram view of an exemplary AI COMINT system.

FIG. 2 depicts a block diagram view of an exemplary AI COMINT system. An AI COMINT system 200 may be used to detect and intercept radio transmissions from unfriendly/hostile actors 201 (referred to as "bad guys with radios or phones" in FIG. 2). For example, the system 200 (or at least some of its sub-components) may be deployed in a war zone with hostile insurgent fighters 201 that are communicating with one another over radio spectrum frequencies. The radio transmissions of the unfriendlies 201 may be intercepted by a radio/sensor module 205. The module 205 may form part of the system 200, and may include computing components 210. The components 210 may include a processor, non-volatile memory (NVM) storing programs/instructions (P1, P2) and data (D1, D2), volatile memory (RAM), and input/output (I/O). The computer 210 may be implemented as a hard block computing device (e.g., as an application specific integrated circuit (ASIC)), or may be implemented as a programmable fabric (e.g., as a field-programmable gate array (FPGA)).

The module 205 includes various hardware components 215. For example, the hardware 215 may include radio electronics (such as radio amplifiers) and at least one radio antenna (such as an omnidirectional antenna). The module 205 may include a radio direction finder engine, that may be designed using both hardware and software components. The module 205 may include a various (software-implemented) engines 220 as well, which may be stored in NVM and/or may include hardware/electronic components. For example, the module 205 may include software defined radio (SDR). In some examples, the module 205 may include a radio signal scanning engine operable to scan a range of radio frequencies for radio signals that carry information/communications. The module 205 may include a signal processing engine, in various embodiments. The signal processing engine may include various signal processing circuitry/software, such as digital signal processors (DSPs), analog to digital converters (ADCs), and signal filters, for example. The module 205 may, in some implementations, include a decryption engine. The decryption engine may function to decrypt intercepted radio communications using various known decryption methods. For example, the decryption engine may be used for decrypting intercepted cell communications that may have been originally transmitted by a cell device/phone. In some implementations, the decryption engine may be included with the computing system 225 (described below).

The radio/sensor module 205 is configured to detect and intercept radio communications from the unfriendlies 201 and deliver the intercepted communications to a local/remote computing system 225 (which is also a part of the system 200). For example, if the module 205 intercepts radio communications that contain voice communications between two unfriendlies 201, then module 205 may transmit audio data associated with the voice communications to the computing system 225 (e.g., in the form of a WAV or MP3 file). The computing system 225 may then process and analyze the intercepted communications using at least one AI/ML process. The system 225 may include computing components 230. The components 230 may include a processor, nonvolatile memory (NVM) storing programs/instructions (P3, P4) and data (D3, D4), volatile memory (RAM), and input/output (I/O).

The components 230 may also include a graphics processing unit (GPU) that is configured to perform parallelized vector operations to speed up the AI/ML operations being executed by the system 225. The computer system 225 may, in various embodiments, be a a distributed computing system that may employ GPU/FPGA arrays, possibly across multiple computer servers for maximum processing power. In various embodiments, the module 205 and the system 225 may be integrated into a single system, unit, or housing, such as a single manned pack, for example.

The system 225 may include various engines for performing various functions/operations. For example, the system 225 may include various AI/ML engines 235 (e.g., a natural language processing (NLP) engine). The AI/ML engines 235 may be implemented as computer-readable instructions stored in NVM, for example. Specialized AI/ML engines 240 may be used for specific AI/ML tasks.

For example, speech recognition engine may be used to perform automated detection of speech within radio communications intercepted by the radio module 205. For example, a speech recognition engine may be able to determine whether a given radio signal contains human speech, or whether it contains non-speech information or radio noise. In various embodiments, a language detection engine may be used to perform automatic language detection for radio messages being intercepted by the radio module 205. In some embodiments, a translation engine may be used to perform automated machine translation of radio communications received from the radio module 205. The translation engine may be used to automatically and reliably translate voices from a first language (e.g., Arabic) to a second language (e.g., English), for example. A sentiment engine may be used to detect sentiment/emotion of the (voice) communications intercepted by the radio module 205. For example, the sentiment engine may use AI to detect the presence (or absence) of aggression, hostility, rage, violence, and other forms of emotion/sentiment, which may be more generally indicative of the "bad guys'" intent-to-harm. The sentiment engine may detect specific words or phrases of interest that may be associated or correlated with a speaker's intent-to harm. For example, if the sentiment engine analyzes the message and finds the presence of words like "attack," "bomb," or "mortar," the sentiment engine may determine that the message conveys an intent to harm.

The computing system 225 may include various alert engines 245 as well. For example, an alert determination engine may be used to determine whether or not an alert should be generated. The alert determination engine may, for example, compare data or metrics derived from the received radio communications, and then compare that data/metrics to predetermined data values (e.g., thresholds) to make a decision about whether an alert should be generated. An alert addressing and transmission engine may determine where/who to a given alert should be transmitted. For example, the alert addressing and transmission engine may use the content/context/metadata of the intercepted radio communications to determine to which personnel, commander, or agency the alert message should be addressed. In this sense, the alert engines may cooperate to deliver targeted intelligence to the proper parties, therefore filtering out those personnel/commanders/agencies for who the given alert would not be appropriate.

The computing system 225 and/or the radio/sensor module 205 may be operably coupled to a network 250. The network 250 may be a secured, private network that uses encryption to encrypt messages on the network, for example. In various examples, the network 250 may be a network that uses the Internet Protocol (IP) standard. The network 250 is configured to receive the alert signal from the computing system 225, and then transmit the alert signal to the relevant personnel/commanders/agencies. For example, the network 250 may deliver the alert message from the system 225 to a commander's computing device 255 (e.g., a desktop computer). When the message is received at the computer 255, it may be displayed on display screen to convey the alert (and its contents) to the commander.

In this illustrative example, an alert message 260 is displayed on the commander's computer 255. The displayed alert message 260 may first indicate that there is an alert (by flashing colors or the popping up an alert box on the commander's computer screen, for example). The displayed message may then show the intelligence information contained in the alert. In this example, the alert indicates that a radio transmission was intercepted from the direction 58° N, 82° W, relative to the location of the radio/sensor module 205, at a transmission frequency of 5.8 Mhz. The system 225 using the language detection engine has detected that the language in the intercepted radio transmission is Arabic. The message further indicates what words/phrases of interest (W/POI) were detected by the sentiment analysis engine of the computing system 225. In this illustrative case, the W/POI includes "mortar," "American," "sneak attack," "AK-47," "air strike," "anti-aircraft," and "0800 hours." The message also indicates what type of sentiment or emotion of the voices in the intercepted radio communication (in this case, "hostile/intent-to-harm"). Accordingly, from this intelligence information, a commander may become aware of an impending attack and may take reactionary measures to best respond to the impending attack.

For example, given the transmission direction of the intercepted radio signal, the commander may be able to order in a preemptive airstrike in the vicinity of the radio transmission direction (58° N, 82° W) to destroy the enemy combatants before they are even able to launch their "sneak attack." However, the commander may suspect that, because the phrase "anti-aircraft" was detected in the intercepted transmissions, that the enemy may be in possession of anti-aircraft weaponry. Therefore, the commander may instead decide to launch a land-based ordinance attack, to protect the commander's aircraft from the enemy's anti-aircraft weaponry. Furthermore, the commander may have received the alert because the commander is a commander of an American base, and so another allied commander (perhaps a commander of English or French forces) may not have the alert addressed to them (as they are not "American," as detected by the W/POI in the intercepted message). In this sense, only the commanders/entities who need to know about the alert may receive the alert, which may advantageously filter out irrelevant or inappropriate personnel who should not receive the alert (or for whom the alert would not be useful). The commander may also take the extracted phrase "0800 hours" as an indication that the enemy's attack may commence at 0800 hours. Therefore, the commander may order heightened security and surveillance for the commander's base at around 0800 hours, in anticipation of an incoming attack. Accordingly, various commanders, agencies, and/or personnel may advantageously make highly informed decisions, and rapidly adapt to imminent threats, using the highly valuable enemy communications intelligence information assembled in the alert message.

Coupled to, or included with, the system 200 is at least one database 265. The database(s) 265 may, for example, be operably coupled to the network 250. In some embodiments, the database(s) 265 may be operably coupled to the radio/sensor module 205, the local/remote computing system 225, and/or the computing device 255. The database(s) 265 may store various parameters, thresholds, and/or other data that is used by the system 200. For example, a database 265 may store a list of words/phrases of interest (W/POI). The W/POI may be preprogrammed (hard-coded) into the system, and/or may be derived based on training data that is input into a machine learning model. A database 265 may contain, in some embodiments, parameters used in the determination of which entities (e.g., personnel/commanders/agencies) the alert message should be addressed to. For example, certain W/POIs may be associated with specific entities in a database 265, such that when the system 200 detects certain W/POIs in an intercepted message, the system 200 may query the database to retrieve a list of which entities should be alerted based on the intercepted message. In various examples, a database 265 may store a list of documented radio frequencies used by known hostile forces in certain geographic areas. In some implementations, a database 265 may store thresholds used for determining whether an alert message should be sent. The thresholds may be preprogrammed (hard-coded) into the system, and/or may be derived based on training data that is input into a machine learning model.

More generally, the database(s) 265 may, in various examples, store any information that facilitates function of the system 200, including the specific functions of module 205 and system 225. In various implementations, the data stored on database(s) 265 may be stored in memory (NVM) of the module 205, system 225, computer 255, or other network connected devices. The database(s) 265 may be implemented as structured query language (SQL) database(s), in some embodiments.

Figure 3:
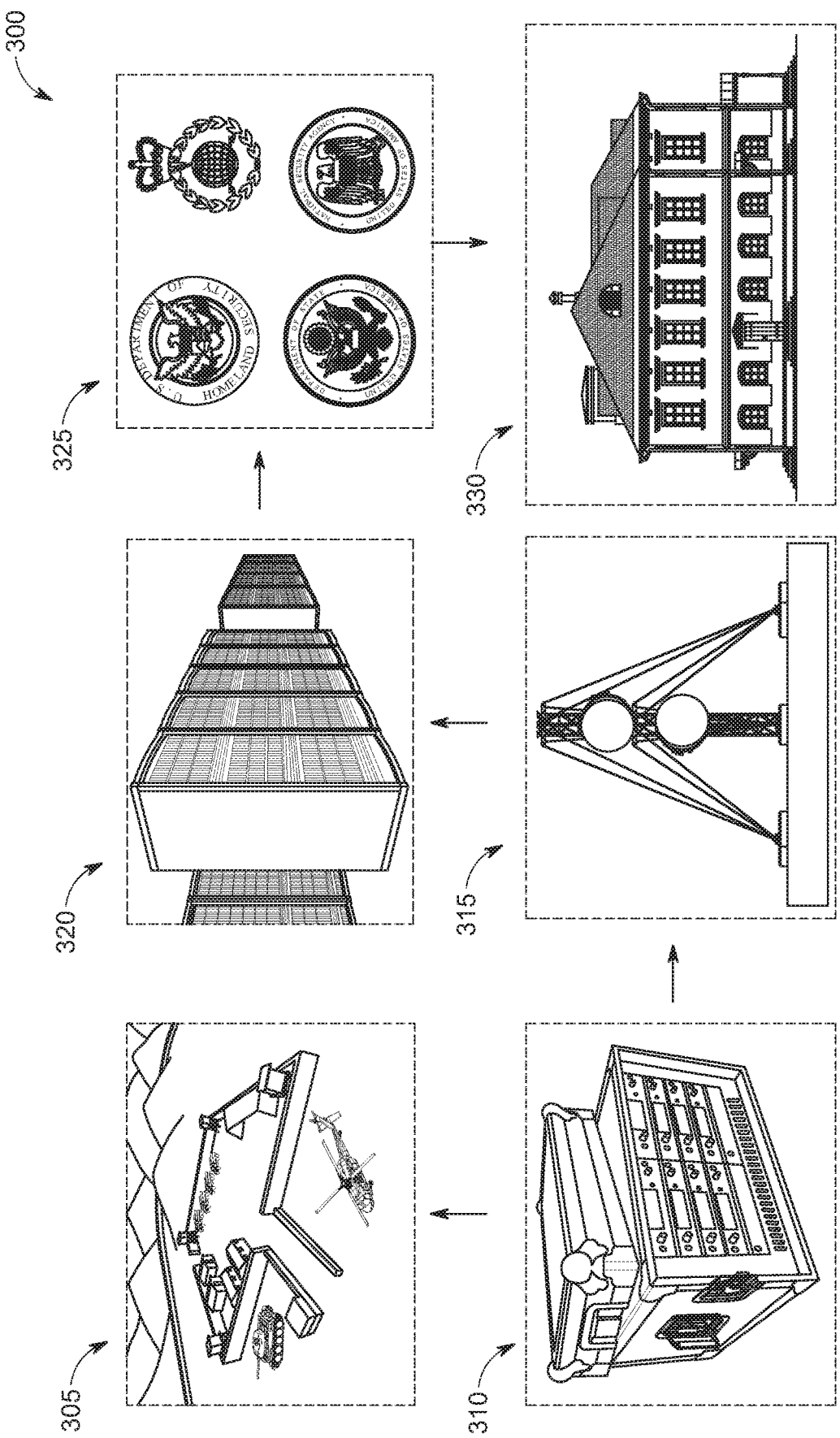
FIG. 3 depicts various aspects of an exemplary AI COMINT system illustrating an exemplary use case.

FIG. 3 depicts various aspects of an exemplary AI COMINT system illustrating an exemplary use case. An exemplary use case scenario 300 depicts an FOB 305. The FOB 305 is surrounded by barriers and includes various buildings and units. Deployable at the FOB 305 is a portable radio rack 310. The radio rack 310 includes at least one radio module (e.g., the radio/sensor modules 205 depicted in FIG. 2). The rack 310 may be plugged into a power source at the FOB 305, or may be powered by a battery, for example. A serviceman sets up the rack 310 at the FOB 305 with the intention of collecting valuable intelligence from enemy forces in a surrounding area of responsibility (AOR). Furthermore, the serviceman connects the rack 310 to a (cell) network, such as through a cell tower 315 that is within radio distance of the radio(s) in the rack 310.

In data communication with the radio(s) of the rack 310 (via the cell network and cell tower 315) is a set of remote servers 320. The remote servers 320 are configured in substantially the fame form as the (remote) computing system 225 (shown in FIG. 2). To illustrate, the servers 320 are configured to execute the following operations: (1) detect and identify speech and language in intercepted radio communications (using Speech and Language Engines in FIG. 2, 240), (2) translate the identified speech from a first language into a second language (using Translation Engine in FIG. 2, 240), (3) analyze the translated speech for words/phrases of interest (W/POI) and sentiment/intent criteria (SIC) (using Sentiment Engine in FIGS. 2, 240), and (4) broadcasting alerts to relevant entities as a function of a set of alert rules and certain detected W/POIs and SICs (using Alert Engines in FIG. 2, 245). The servers 320 may utilize artificial intelligence/machine learning (AI/ML) techniques when performing at least some of the above operations, using AI/ML/NLP Engines in FIG. 2, 235.

In the illustration of FIG. 3, the servers 320 are operably coupled to deliver intelligence alerts to personnel at various governmental agencies. In this example, the servers 320 have determined to transmit an intelligence alert to four different governmental agencies: U.S. Department of Homeland Security, U.S. Department of State, U.S. National Security Agency, and U.K Government Communications Headquarters. After receiving the intelligence, these agencies will then notify the relevant people in an identified area of danger—in this case, the personnel and staff occupying and overseeing a foreign embassy 330. This exemplary scenario 300 illustrates how the benefits of the COMINT system 200 may be realized not just on the battlefield, but in other arenas. For example, a COMINT system disclosed herein may be deployed to monitor radio communications at a port authority, installed near an oil field in a country with an unstable government, mounted atop an embassy in a first-world country, or setup at a major air field to foil terrorist plots. This scenario 300 also shows how the COMINT system 200 may find use not just with military personnel and commanders, but also for IC community (including governmental agencies) and civilian population more broadly.

Figure 4:
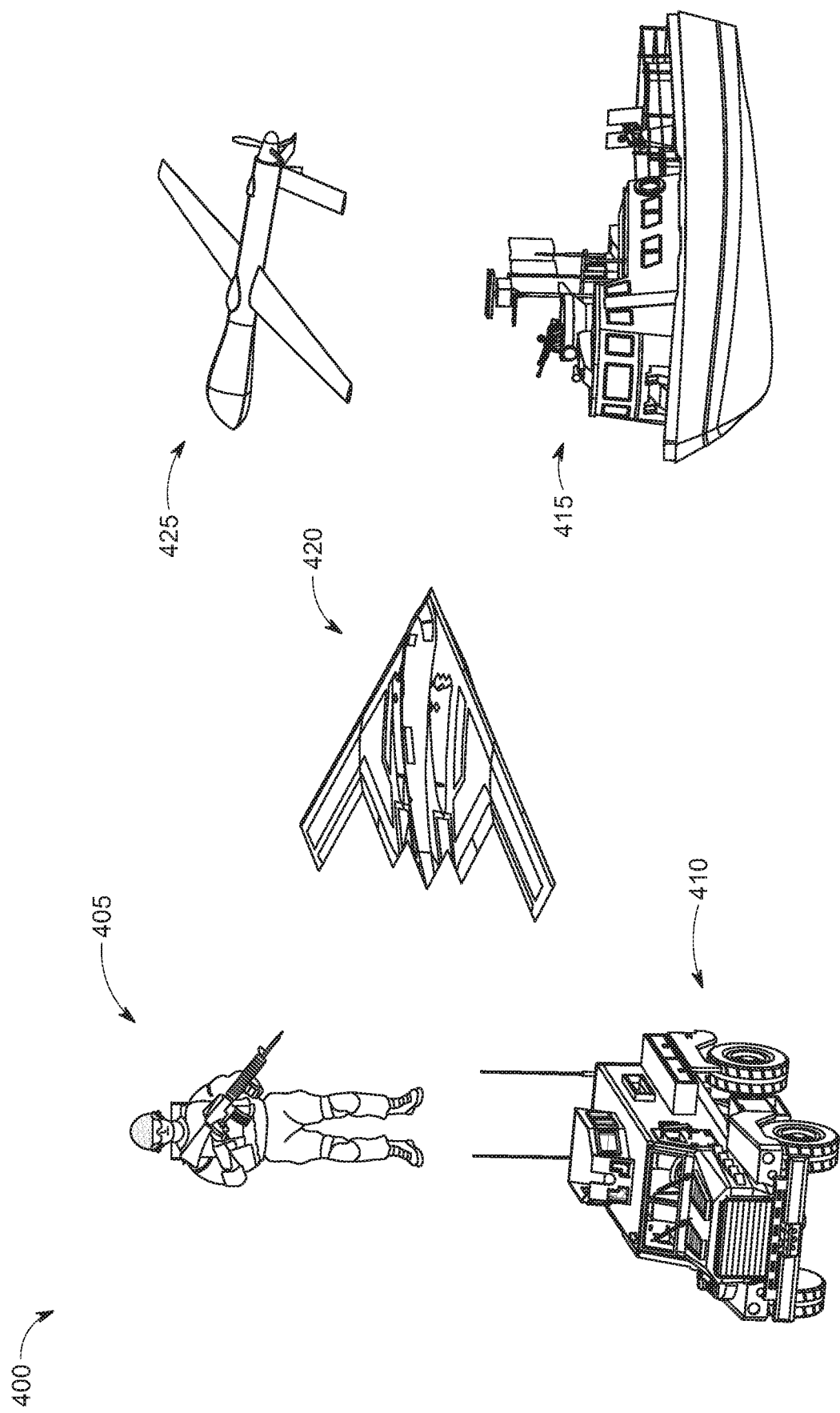
FIG. 4 depicts perspective views of exemplary deployment platforms for an AI COMINT system.

FIG. 4 depicts perspective views of exemplary deployment platforms for an AI COMINT system. Although, FIG. 1 illustrates a COMINT system 125 as a tripod-deployed unit, and the FIG. 3 depicts a COMINT system as a radio rack 310 along with a set of servers 320, these embodiments are merely for purposes of illustration, and are not meant to be construed as limiting. A COMINT system may be implemented using a variety of platforms 400, each with their own strategic/tactical advantages.

For example, a manned pack unit 405 may be employed in various implementations of a COMINT system. The manned pack 405 may include a radio module (e.g., radio/sensor module 205, FIG. 2), and/or a local computing system (e.g., computing system 225, FIG. 2). The manned pack 405 may be battery powered, in some embodiments. In some implementations, a COMINT system may be deployed on a land terrain vehicle 410. Mounted on the vehicle 410 may be a radio module (e.g., radio/sensor module 205, FIG. 2), and/or a local computing system (e.g., computing system 225, FIG. 2). In several examples, a COMINT system may be deployed on a sea-based vessel 415. Integrated with the vessel 415 may be a radio module (e.g., radio/sensor module 205, FIG. 2), and/or a local computing system (e.g., computing system 225, FIG. 2). In various embodiments, a COMINT system may be deployed on a manned stealth reconnaissance aircraft 420. Included with the aircraft 420 may be a radio module (e.g., radio/sensor module 205, FIG. 2), and/or a local computing system (e.g., computing system 225, FIG. 2). In some implementations, a COMINT system may be deployed on an unmanned aerial vehicle (UAV) 425. Inside the fuselage of the UAV 425 may be a radio module (e.g., radio/sensor module 205, FIG. 2), and/or a local computing system (e.g., computing system 225, FIG. 2). The integration of a COMINT system to a variety of different platforms may provide additional versatility and functionality to an AI-based threat detection and alert broadcasting system.

Figure 5:
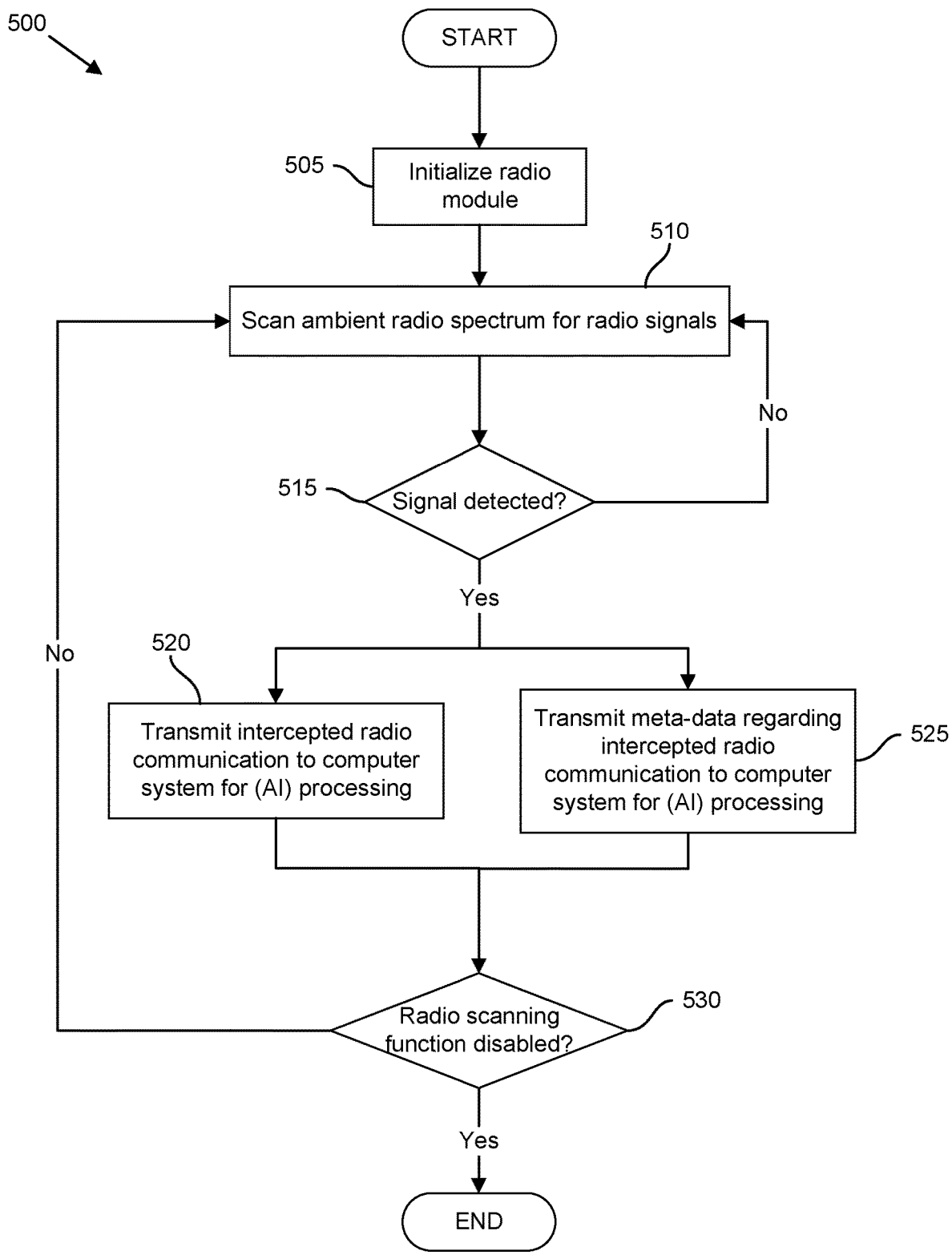
FIG. 5 depicts a flowchart of exemplary radio control operations.

FIG. 5 depicts a flowchart of exemplary radio control operations. A radio control process 500 may be executed by the computing components 210 of the radio/sensor module 205 depicted in FIG. 2, for example. The process 500 may begin at step 505 by initializing the radio module, such as booting up systems for a software defined radio (SDR) or configuring various radio parameters, for example. At step 510, the process begins signal reconnaissance operations by scanning the surrounding electromagnetic spectrum for the presence of radio signals (human or machine produced). For example, the process may scan in a band of frequencies (e.g., between 2 MHz and 8.5 GHz) for radio signals that meet the characteristics of radio frequency transmission of data that would originate from radio transmitters in the surrounding area. Next, at step 515 if no radio signals are detected, then the process continues to scan the area for radio signals. If, at step 515, a radio signal is detected, then the process continues to step 520 and/or step 525.

At step 520, the process transmits the intercepted radio communication to a computer system (e.g., local/remote computing system 225) for (AI) processing. For example, the process may transmit an audio file (e.g., WAV, MP3) of the intercepted radio communication to the computing system 225. The audio file may be generated after the original message has been decrypted by the decryption engine, in various examples. In some embodiments, the process may pre-convert the communication to text at the radio module, such that the process may transmit text-based data representing the audio communication. At step 525, the process transmits meta-data regarding intercepted radio communication to a computer system (e.g., local/remote computing system 225) for (AI) processing. Meta-data pertaining to the intercepted radio communications may include various forms of data. For example, the meta-data may include information such as: who is transmitting the intercepted communication (if the transmitting party is retrievable from the message); a transmission origination location; a direction of the transmission; a table of signal against location (e.g., if the transmitter is moving); a time/duration of the transmission, and a transmission schedule (if it is a periodic transmission); frequencies and other technical characteristics of the transmission; an indication of whether the transmission is encrypted or not, and/or transmission address(es) (if addresses are retrievable from the message).

Next, at step 530, the process will loop back to step 510 to continue scanning for signals until radio scanning is disabled, at which the process ends. In various examples, multiple processes 500 may be performed in parallel by a single (or multiple) radio module, such that a radio module may possess the capability of actively monitoring around 30, 40, or about 50 (or more) different conversations at a time. In this sense, a radio module may continually harvest vast amounts of radio communication data for use by a high-powered computing system in performing complex and sophisticated AI processing techniques, to advantageously alert allied forces of impending danger and save valuable lives.

In some examples, the process 500 may include an (optional) step of decrypting the detected radio signal. For example, after a radio signal is detected at step 515, the process may then detect whether the detected radio signal is decrypted, and if so, the process may attempt to decrypt the detected signal. This decryption may be performed, for example, using the decryption engine of the computing system 225 shown in FIG. 2.

Figure 6:
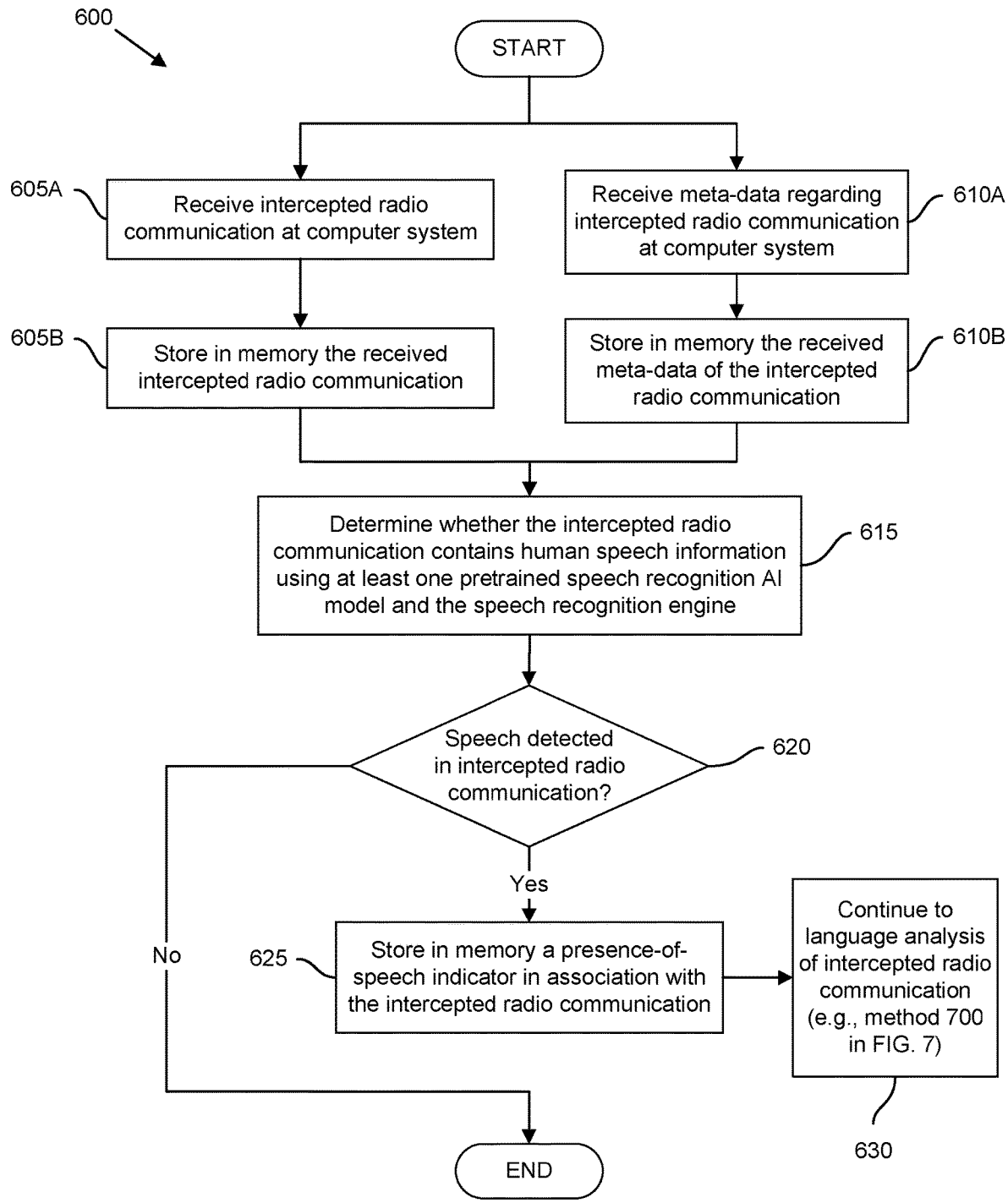
FIG. 6 depicts a flowchart of an exemplary (AI) speech recognition process.

FIG. 6 depicts a flowchart of an exemplary (AI) speech recognition process. A speech recognition process 600 may be executed by the computing components 230 of the computing system 225 (including the speech recognition engine) depicted in FIG. 2, for example. The process 600 starts with the system receiving the intercepted radio communication at the computer system at step 605A, and/or receiving meta-data regarding intercepted radio communication at computer system at step 610A (e.g., received from the radio module at steps 520 and/or 525 of FIG. 5). Next, the process stores the received radio communication in memory at step 605B, and/or stores the received meta-data in memory at step 610B.

Next, at step 615 the process determines whether the intercepted radio communication contains human speech information using at least one pretrained speech recognition AI model and the speech recognition engine. For example, the process may execute speech recognition operations using a Hidden Markov Model (HMM). An advantage of an HMM may be that the HMM can be trained automatically and is computationally feasible in many real-world applications. If at step 620, there is not any speech detected in intercepted radio communication (e.g., after attempting to decrypt of detect speech for a predetermined time threshold), then the process 600 ends. 620. If at step 620, there is speech detected in intercepted radio communication, then at step 625, the process stores in memory a presence-of-speech indicator in association with the intercepted radio communication. This presence-of-speech indicator may be used by other processes to identify which intercepted radio communications were "flagged" as containing (or not containing) speech. Next, at step 630, the process continues to language analysis of intercepted radio communication (e.g., method 700 in FIG. 7). In various examples, the steps/operations of processes 600 and 700 may be combined into a unified language detection process. In various examples, the speech detection process 600 may be optional, or replaced by the language detection process 700 (described below).

Figure 7:
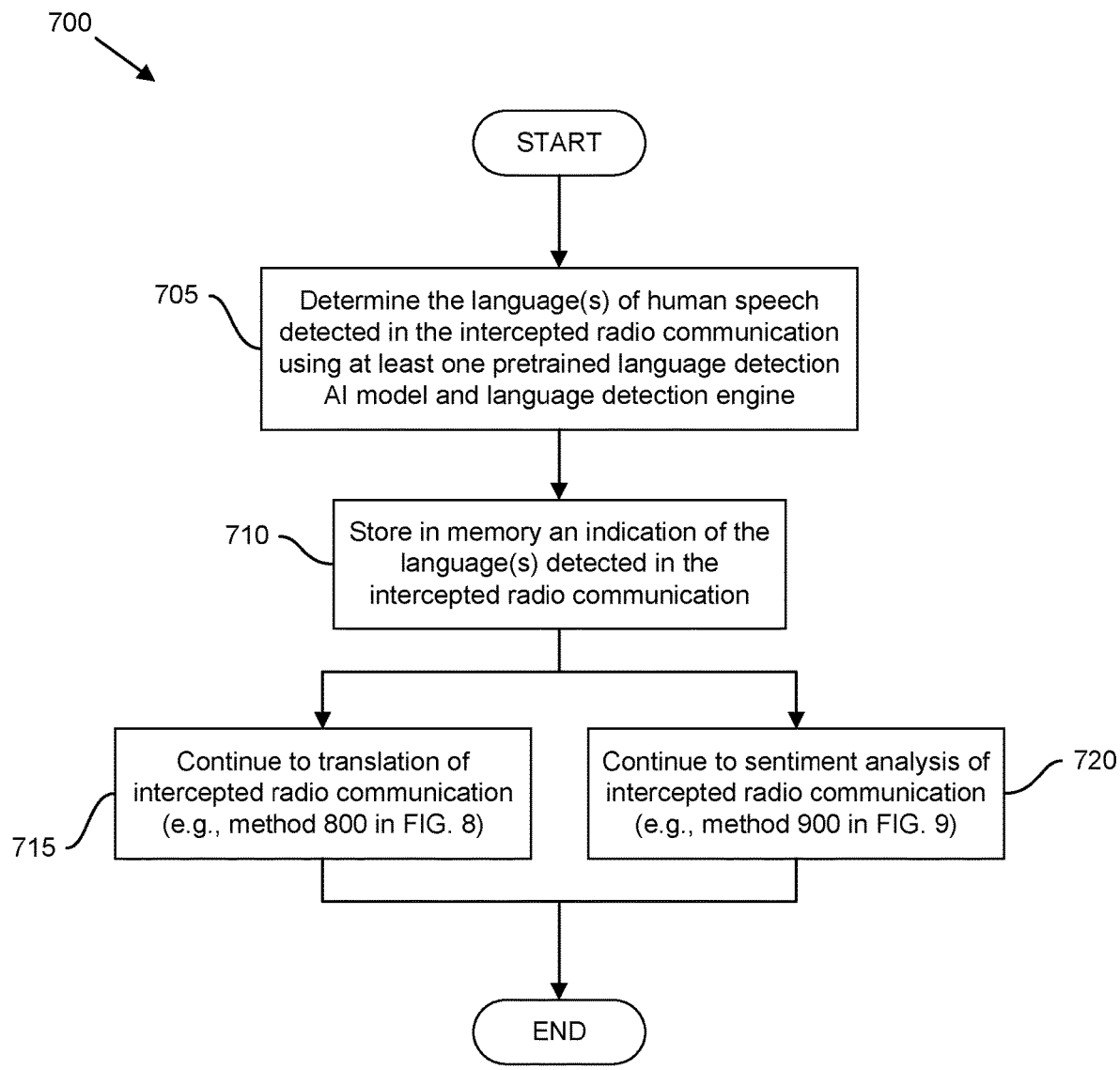
FIG. 7 depicts a flowchart of an exemplary (AI) language identification process.

FIG. 7 depicts a flowchart of an exemplary (AI) language identification process. A language identification process 700 may be executed by the computing components 230 of the computing system 225 (including the language detection engine) depicted in FIG. 2, for example. The process 700 starts with determining the language(s) of human speech detected in the intercepted radio communication using at least one pretrained language detection AI model and language detection engine. For example, the process may execute language identification operations using a (deep) neural network that has been pretrained using a large sample set of corpora spanning across a wide variety of languages. Next, the process stores in memory an indication of the language(s) detected in the intercepted radio communication at step 710. Next, the process continues to the translation of the intercepted radio communication (e.g., method 800 in FIG. 8) at step 715, and/or continues to sentiment analysis of the intercepted radio communication (e.g., method 900 in FIG. 9) at step 720. For example, if the process determines that the only language spoken in the intercepted radio communication is English, then the process may continue directly to process 900 (as no translation may be required in such a scenario).

Figure 8:
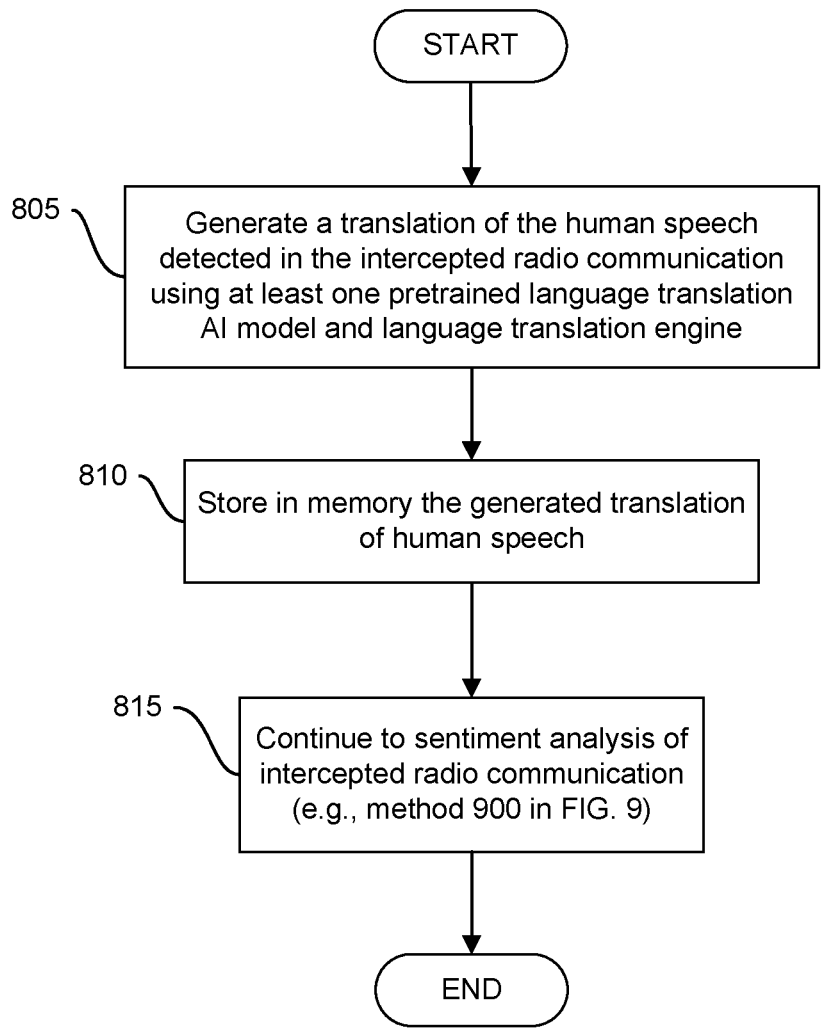
FIG. 8 depicts a flowchart of an exemplary (AI) translation process.

FIG. 8 depicts a flowchart of an exemplary (AI) translation process. A translation process 800 may be executed by the computing components 230 of the computing system 225 (including the translation engine) depicted in FIG. 2, for example. The process 800 starts with generating a translation of the human speech detected in the intercepted radio communication using at least one pretrained language translation AI model and language translation engine at step 805. For example, the process may execute language translation operations using a neural machine translation (NMT) model. The translation may be from a first language into a second language. In some implementations, multiple translations may be performed at step 805 (e.g., the original message may be translated into English, French, German, and Spanish). Next, the process stores in memory the generated translation of human speech at step 810. Next, the process continues to sentiment analysis of intercepted radio communication (e.g., method 900 in FIG. 9) at step 815.

Figure 9:
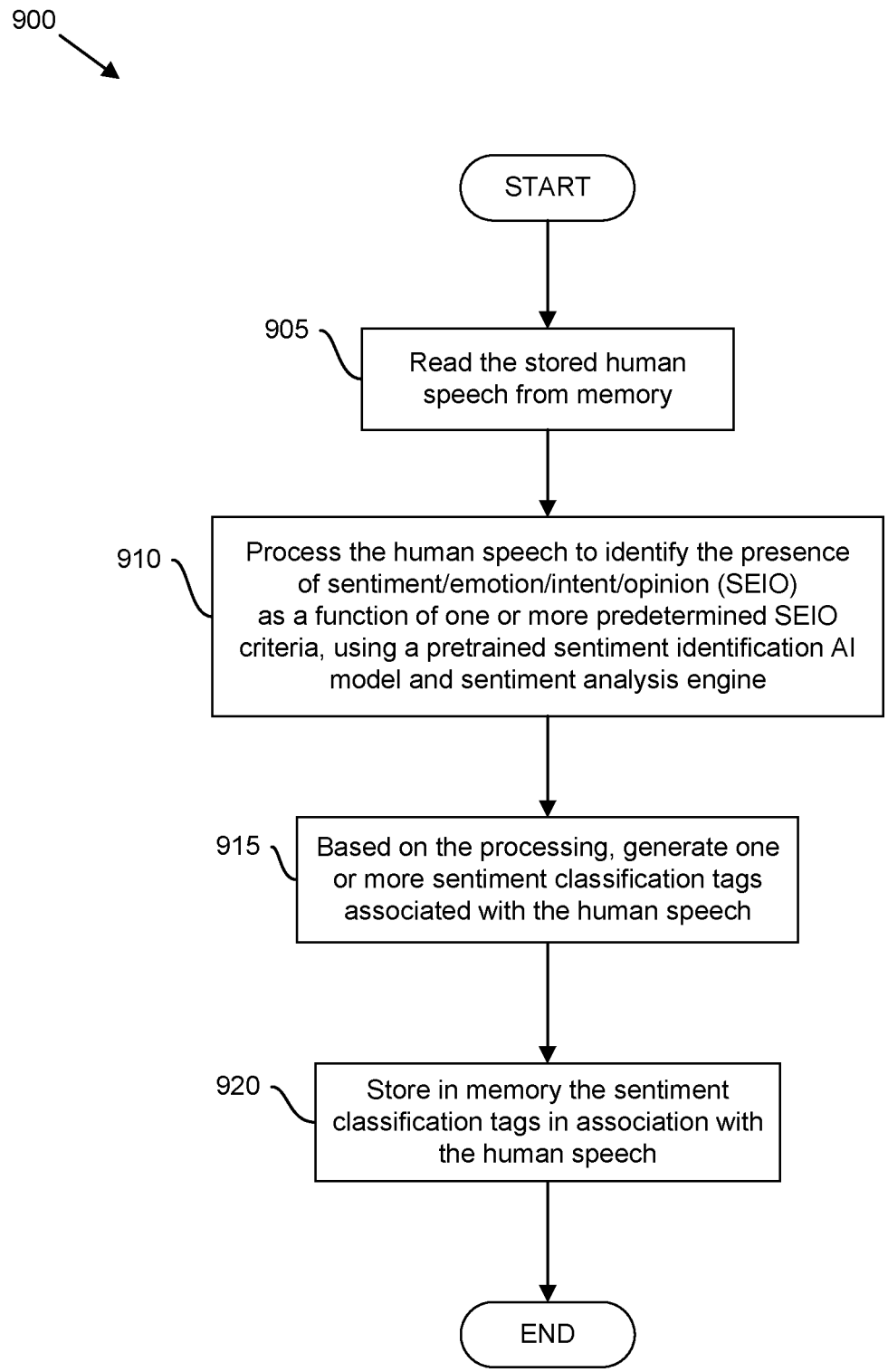
FIG. 9 depicts a flowchart of an exemplary (AI) sentiment, emotion, intent, and opinion (SEIO) analysis process.

FIG. 9 depicts a flowchart of an exemplary (AI) sentiment, emotion, intent, and opinion (SEIO) analysis process. A SEIO analysis process 500 may be executed by the computing components 230 of the computing system 225 (including the sentiment analysis engine) depicted in FIG. 2, for example. The process 900 starts with reading from memory the stored human speech (that was originally transmitted in the intercepted radio communication) at step 905. The human speech may be in the form of the original audio file transmitted by the module 205 and received at the system 225, for example. In some embodiments, the human speech read at 905 may be pre-translated (e.g., using process 800) and/or stored in text-based format. Next, the process 900 continues to step 910 to process the human speech to identify sentiment/emotion/intent/opinion (SEIO) of the speech as a function of one or more predetermined SEIO criteria, using a pretrained sentiment identification AI model and sentiment analysis engine. For example, the SEIO identification process may be executed using a statistical machine learning classification model that leverages support vector machines (SVMs). Next, based on the processing at step 910, one or more sentiment classification tags are generated that are each associated with the human speech. Finally, at step 920, the process then stores in memory the generated sentiment classification tags (e.g., in association with the human speech originating from the intercepted radio communication).

Figure 10:
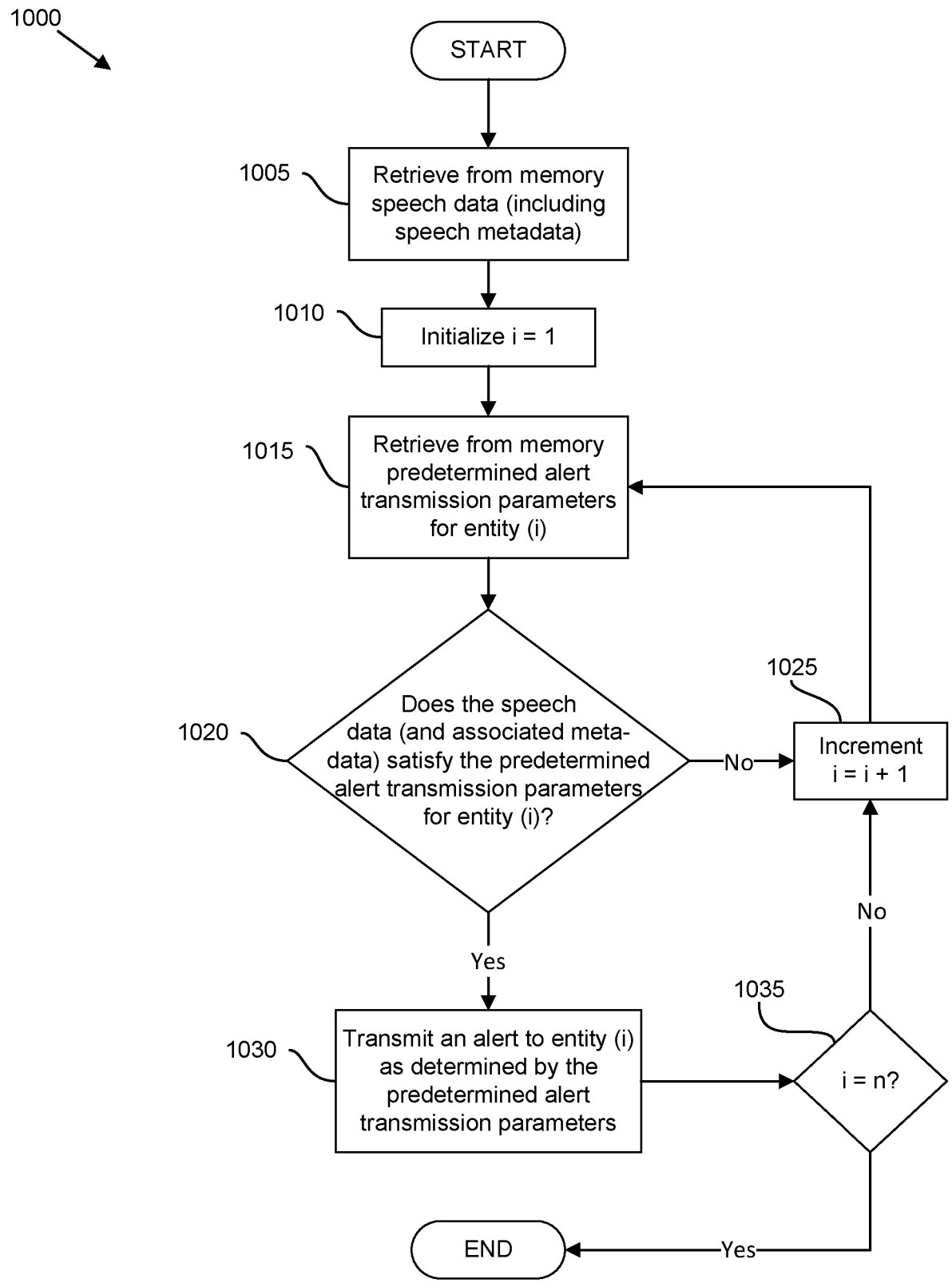
FIG. 10 depicts a flowchart of an exemplary rules-based alerting process.

FIG. 10 depicts a flowchart of an exemplary rules-based alerting process. An alerting process 1000 may be executed by the computing components 230 of the computing system 225 (including the alert determination engine and alert addressing and transmission engine) depicted in FIG. 2, for example. The process 1000 starts with the system retrieving speech data (optionally along with the associated metadata) from memory. The speech data may include data previously derived in processes 500-900, for example. Next, the process initializes variable i to 1 at step 1010. The variable i may represent an index associated with each entity and/or alert transmission parameter set stored in memory. Next, at step 1015 the process retrieves the (predetermined) alert transmission parameters associated with entity (i). Entity (i) may be a commander at an FOB, a governor of a state, or a governmental agency, for example. Examples of predetermined alert transmission parameters are shown in the exemplary table shown in FIG. 11 (and discussed further below). Next, the process determines whether the speech data (and associated meta-data) satisfy the predetermined alert transmission parameters for entity (i)? If not, then the process continues to step 1025 with i being incremented (i=i+1), and then looping back to step 1015 to perform the same operations for the next entity (i). If at step 1020, the speech data (and associated meta-data) satisfy the predetermined alert transmission parameters for entity (i), then the process transmits an alert to that entity (i) in accordance with the predetermined alert transmission parameters. Next, the process continues to determine whether the current value of i is equal to n, where n may be the total number of entities and/or alert transmission parameter sets stored in memory. If i does not equal n, the process continues to step 1025 to increment i and then continues to loop through steps 1015-1035. If i equals n, the process ends.

FIG. 11 depicts a table illustrating an exemplary set of alert transmission parameters/criteria. An alert transmission parameter table 1100 may be stored in memory (e.g., NVM component in computing components 230, or database(s) 265 depicted in FIG. 2). For example, the table 1100 may be stored as an SQL table in at least one database 265. In this illustrative depiction, the table includes multiple rows and columns. Each row may be associated with a specific entity who may be alerted to radio communications intercepted by the radio module 205, for example. Each column may be a different data type that may be used in determining which entity may receive an alert, and what device the alert is addressed to (e.g., the IP address of the receiving device).

In this depiction, a top header row indicates that the first column contains data indicative of an entity who may be sent an alert. The first row under the header row details a first entity being a U.S. Commander at FOB 25 in Afghanistan. As indicated by column two, this first alert parameter row has been set to indicate that alerts should be transmitted to the cell phone of the FOB 25 Commander. The delivery method (per column 3) is a text/SMS message. In this depiction, the first three columns indicate who/where/how to send an alert. The later columns indicate the conditions or criteria used to determine when to send an alert.

In this depiction, the first alert parameter row has an "N/A" value for the "TX Frequency" column. This means that for this programmed alert (determined by the parameters in the first row), the FOB 25 Commander does not care about on which frequency the intercepted radio communication is received. Put another way, when the system determines whether to send an alert to FOB 25 Commander, the system compares the frequency of transmission of the intercepted radio communication to the data in the "TX Frequency" cell for FOB 25 Commander. In this case, because "N/A" is in the given cell, this parameter is irrelevant to the determination of whether FOB 25 Commander will receive an alert. However, as see in the "Language" column, first row, the alert for FOB 25 Commander does include "Arabic" as the language criteria for whether an alert should be sent to FOB Commander 25. Therefore, is the language detected in process 700 is not Arabic, then that intercepted radio message would not meet the alert criteria for FOB Commander 25, and so no alert would be sent to that entity. Looking at the later columns, the alert parameters/criteria for the first row further indicate that the alert should only be sent to the FOB 25 Commander if: (1) W/POI detected in the intercepted radio message contains the words "artillery" and/or "weaponry," (2) the sentiment detected in the intercepted radio message was determined to be "unfriendly," "hostile," and/or "aggressive," and (3) the detected/estimated origination location of the intercepted radio message is from the "Kandahar Province, Afghanistan." Accordingly, the alert parameters/criteria associated with FOB 25 Commander (along with the speech data and associated metadata) may determine the conditions under which the system will transmit an alert to this entity.

Other rows in this table illustrate the customizability and highly-controlled nature of the alert parameters/criteria. For example, as shown by the second row, a French Commander at FOB 11 in the Central African Republic (CAR) may be sent an alert if the intercepted radio communication is between 5 MHz to 2.1 GHz and the estimated origination location is anywhere in the CAR. Further, as indicated by the "Sentiment" column, the FOB 11 Commander only receives alert messages for intercepted communications that were previously labeled as having "hostile" and/or "aggressive" sentiment (the FOB 11 Commander will not be alerted when the intercepted communication is merely "unfriendly"). For the third row, the alert criteria for the U.S. Embassy in Pakistan includes only those intercepted communications that fall within a narrow band of 6.5 GHz to 6.7 GHz, are encrypted, have an FM modulation mode, and originated from within a 30 mile radius of Karachi, Pakistan (where the U.S. Embassy is located). In other examples, an oil tanker off the coast of Yemen may be very interested in receiving intelligence alerts regarding pirates in the Gulf of Aden (as dictated by the alert criteria in row 4), while the Mayor of New York City may have zero interest in such alerts, and may instead be interested in alerts for radio communications in the English language intercepted around New York City that contain the words/phrases "bomb" and/or "explosion" (as dictated by the alert criteria in row 7). Accordingly, this exemplary table demonstrates how each set of alert parameters/criteria may be preset to meet the specific intelligence needs of a given entity to advantageously control which entities receive an alert for a given intercepted radio communication.

Although various embodiments have been described with reference to the Figures, other embodiments are possible.

For example, a communications intelligence (COMINT) system may include a radio signal intercepting device (e.g., radio module 205) configured to scan and intercept ambient radio transmissions. The radio signal intercepting device may be configured to transmit radio data pertaining to an intercepted radio transmission. A COMINT system may include a computing device operably coupled to the radio device to receive the radio data. The computing device may include an input/output (I/O), at least one processor, and at least one data store. The data store may store instructions that, when executed by the at least one processor, cause the at least one processor to perform operations to selectively provide intelligence alerts to specific entities based on the received radio transmissions and a set of predetermined alert transmission criteria. The operations may include, for example, receiving the radio data from the radio signal intercepting device. The operations may include processing the radio data to determine a presence of at least one verbal utterance in the radio data. The operations may include processing the radio data to determine at least one sentiment classification of the radio data using a sentiment analysis engine. The sentiment analysis engine may, in some embodiments, execute at least one statistical machine learning operation in the processing of the radio data to determine the at least one sentiment classification of the radio data. The operations may include determining, based on the processing of the radio data, whether the at least one verbal utterance and/or the at least one sentiment classification satisfy specific alert transmission criteria in the set of predetermined alert transmission criteria. The operations may include, upon determining that at least one verbal utterance and the at least one sentiment classification satisfy the specific alert transmission criteria, transmitting, via the I/O, an intelligence alert addressed to a target entity as determined by the specific alert transmission criteria.

In some implementations, the radio signal intercepting device may be in direct wired and electrical communication with the computing device. In various examples, the computing device may be one or more remote servers that is/are remotely located from the radio signal intercepting device. In various embodiments, the radio data may include an audio record of the intercepted radio communication. In various embodiments, the radio data may include metadata pertaining to the intercepted radio communication. The metadata may include, for example, a transmission frequency on which the intercepted radio communication was transmitted, a modulation mode of the intercepted radio communication, and/or an origination location of the intercepted radio communication.

In some examples, the operations may include processing the radio data to determine a presence of at least one spoken language in the radio data using a language detection engine. In some examples, the operations may include determining, based on the processing of the radio data, whether the at least one spoken language satisfies the specific alert transmission criteria in the set of predetermined alert transmission criteria. In some examples, upon determining the at least one spoken language satisfies the specific alert transmission criteria, the operations may include transmitting, via the I/O, an intelligence alert addressed to the target entity as determined by the specific alert transmission criteria. In some examples, the operations may include processing the radio data to generate a translation of audio speech comprised in the radio data using a translation engine. In some examples, the operations may include the translation in the intelligence alert. In some embodiments, the intelligence alert may include an indication of the at least one verbal utterance that satisfied the specific alert transmission criteria, and/or an indication of the at least one sentiment classification that satisfied the specific transmission criteria. The operations may include, in various examples, adjusting contents of the intelligence alert as a function of a communication bandwidth between the computing system and a target device associated with the target entity, before transmitting the intelligence alert to the target device of the target entity. In various implementations, the set of predetermined alert transmission criteria comprise user-configurable parameters.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the memory can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. In some examples, various steps of operations may be optional or not required. In various implementations, various components or process steps may be combined or integrated with one another. Accordingly, other implementations are within the scope of the following claims.

What is claimed is:

1. A communications intelligence (COMINT) system comprising:
    a radio signal intercepting device configured to scan and intercept ambient radio transmissions, and being further configured to transmit radio data pertaining to an intercepted radio transmission;
    a computing device operably coupled to the radio device to receive the radio data, the computing device comprising:
        an input/output (I/O);
        at least one processor;
        at least one data store storing instructions that, when executed by the at least one processor, cause the at least one processor to perform operations to selectively provide intelligence alerts to specific entities based on the received radio transmissions and a set of predetermined alert transmission criteria, the operations comprising:
            receiving, from the radio signal intercepting device, the radio data;
            processing the radio data to determine: (1) a presence of at least one verbal utterance in the radio data, and (2) at least one sentiment classification of the radio data using a sentiment analysis engine, wherein the sentiment analysis engine executes at least one statistical machine learning operation in the processing of the radio data to determine the at least one sentiment classification of the radio data;
            determining, based on the processing of the radio data, whether the at least one verbal utterance and the at least one sentiment classification satisfy specific alert transmission criteria in the set of predetermined alert transmission criteria;
            upon determining that at least one verbal utterance and the at least one sentiment classification satisfy the specific alert transmission criteria, transmitting, via the I/O, an intelligence alert addressed to a target entity as determined by the specific alert transmission criteria; and,
            before transmitting the intelligence alert, selecting contents for inclusion in the intelligence alert as a function of a communication bandwidth between the computing system and a target device associated with the target entity.

2. The system of claim 1, wherein the radio signal intercepting device is in direct wired and electrical communication with the computing device.

3. The system of claim 1, wherein the computing device comprises at least one remote server that is remotely located from the radio signal intercepting device.

4. The system of claim 1, wherein the radio data comprises:
    an audio record of the intercepted radio communication; and,
    metadata pertaining to the intercepted radio communication.

5. The system of claim 4, wherein the metadata comprises at least one of:
    a transmission frequency on which the intercepted radio communication was transmitted;

a modulation mode of the intercepted radio communication; and, an origination location of the intercepted radio communication.

6. The system of claim 1, wherein the operations further comprise:

processing the radio data to determine a presence of at least one spoken language in the radio data using a language detection engine;

determining, based on the processing of the radio data, whether the at least one spoken language satisfies the specific alert transmission criteria in the set of predetermined alert transmission criteria;

upon determining the at least one spoken language satisfies the specific alert transmission criteria, transmitting, via the I/O, an intelligence alert addressed to the target entity as determined by the specific alert transmission criteria.

7. The system of claim 1, wherein the operations further comprise:

processing the radio data to generate a translation of audio speech comprised in the radio data using a translation engine; and, including the translation in the intelligence alert.

8. The system of claim 1, wherein the intelligence alert comprises:

an indication of the at least one verbal utterance that satisfied the specific alert transmission criteria; and, an indication of the at least one sentiment classification that satisfied the specific transmission criteria.

9. The system of claim 1, wherein the set of predetermined alert transmission criteria comprise user-configurable parameters.

10. A communications intelligence (COMINT) system comprising:

a radio signal intercepting device configured to scan and intercept ambient radio transmissions, and being further configured to transmit radio data pertaining to an intercepted radio transmission;

a computing device operably coupled to the radio device to receive the radio data, the computing device comprising:

an input/output (I/O);

at least one processor;

at least one data store storing instructions that, when executed by the at least one processor, cause the at least one processor to perform operations to selectively provide intelligence alerts to specific entities based on the received radio transmissions and a set of predetermined alert transmission criteria, the operations comprising:

receiving, from the radio signal intercepting device, the radio data;

processing the radio data to determine: (1) a presence of at least one verbal utterance in the radio data, and (2) at least one sentiment classification of the radio data using a sentiment analysis engine;

determining, based on the processing of the radio data, whether the at least one verbal utterance and the at least one sentiment classification satisfy specific alert transmission criteria in the set of predetermined alert transmission criteria; and upon determining that at least one verbal utterance and the at least one sentiment classification satisfy the specific alert transmission criteria;

selecting at least one form of content to include in an intelligence alert for a target entity as a function of: (a) the at least one verbal utterance and (b) at least one alert transmission criterion of the set of predetermined alert transmission criteria, wherein the at least one alert transmission criterion is associated with the target entity, and transmitting, via the I/O, the intelligence alert addressed to the target entity as determined by the specific alert transmission criteria.

11. The system of claim 10, wherein the radio signal intercepting device is in direct wired and electrical communication with the computing device.

12. The system of claim 10, wherein the computing device comprises at least one remote server that is remotely located from the radio signal intercepting device.

13. The system of claim 10, wherein the radio data comprises:

an audio record of the intercepted radio communication; and, metadata pertaining to the intercepted radio communication.

14. The system of claim 13, wherein the metadata comprises at least one of:

a transmission frequency on which the intercepted radio communication was transmitted;

a modulation mode of the intercepted radio communication; and, an origination location of the intercepted radio communication.

15. The system of claim 10, wherein the intelligence alert comprises:

an indication of the at least one verbal utterance that satisfied the specific alert transmission criteria; and, an indication of the at least one sentiment classification that satisfied the specific transmission criteria.

16. A communications intelligence (COMINT) system comprising:

a computing device configured to receive radio data from a radio signal intercepting device configured to scan and intercept ambient radio transmissions, the computing device comprising:

an input/output (I/O);

at least one processor;

at least one data store storing instructions that, when executed by the at least one processor, cause the at least one processor to perform operations to selectively provide intelligence alerts to specific entities based on the received radio transmissions and a set of predetermined alert transmission criteria, the operations comprising:

receiving, from the radio signal intercepting device, the radio data;

processing the radio data to determine: (1) a presence of at least one verbal utterance in the radio data, and (2) at least one sentiment classification of the radio data using a sentiment analysis engine;

determining, based on the processing of the radio data, whether the at least one verbal utterance and the at least one sentiment classification satisfy specific alert transmission criteria in the set of predetermined alert transmission criteria; and upon determining that at least one verbal utterance and the at least one sentiment classification satisfy the specific alert transmission criteria:

selecting contents for inclusion in an intelligence alert as a function of a communication bandwidth between the computing system and a target device associated with a target entity, and transmitting, via the I/O, the intelligence alert addressed to a target entity as determined by the specific alert transmission criteria.

17. The system of claim 16, wherein the radio signal intercepting device is in direct wired and electrical communication with the computing device.

18. The system of claim 16, wherein the computing device comprises at least one remote server that is remotely located from the radio signal intercepting device.

19. The system of claim 16, wherein the radio data comprises:
   an audio record of the intercepted radio communication; and,
   metadata pertaining to the intercepted radio communication.

* * * * *